H. JACOB.
TELESCOPE OF UNVARIABLE LENGTH AND PROGRESSIVELY VARIABLE MAGNIFICATION.
APPLICATION FILED APR. 1, 1913.
1,116,069.  Patented Nov. 3, 1914.
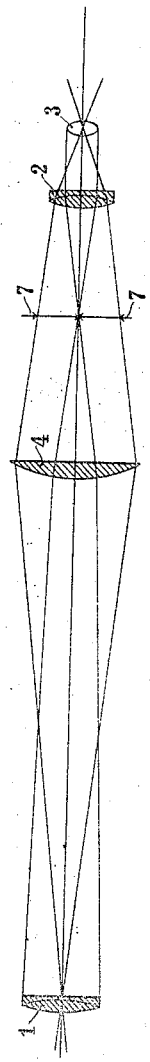
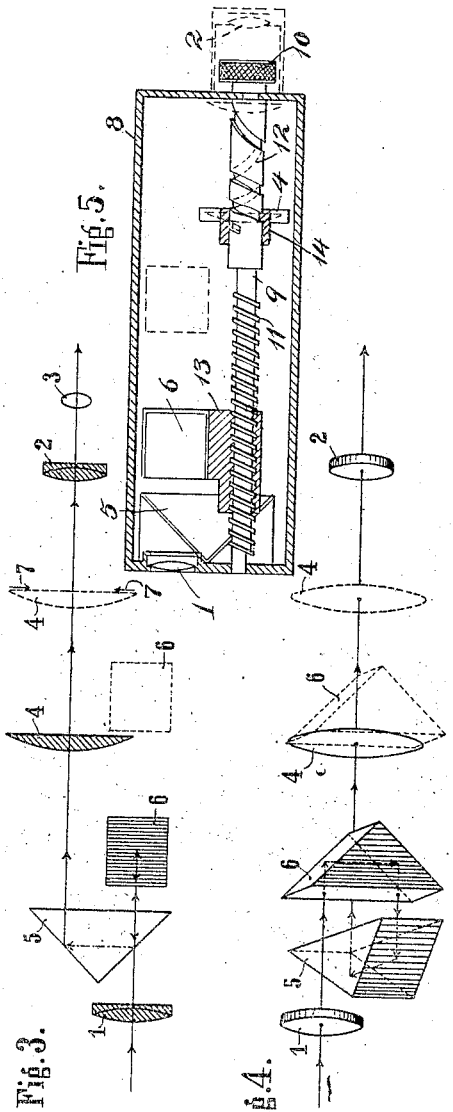
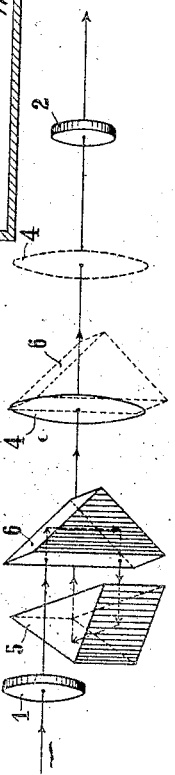

UNITED STATES PATENT OFFICE.

HEINRICH JACOB, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

TELESCOPE OF UNVARIABLE LENGTH AND PROGRESSIVELY-VARIABLE MAGNIFICATION.

1,116,069.   Specification of Letters Patent.   Patented Nov. 3, 1914.

Application filed April 1, 1913. Serial No. 758,242.

*To all whom it may concern:*

Be it known that I, HEINRICH JACOB, a citizen of the German Empire, and resident of Steglitz, near Berlin, Germany, have invented certain new and useful Improvements in Telescopes of Unvariable Length and Progressively-Variable Magnification, of which the following is a specification.

The invention relates to improvements in telescopes of unvariable length and progressively variable magnification and its main object is to obtain the progressive change of the magnification with a very short instrument and with the use of very simple means. To this end a lens system and a multiple system of reversing prisms is inserted between the objective of the instrument and its image plane, which systems are movably arranged and connected with each other in such a way that the elements of the system of prisms eliminate by the change of the length of the light path effected by them at their adjustment the displacement of the image plane of the objective effected by the displacement of the lens system.

The invention is illustrated in the drawing, in which—

Figure 1 shows the optical elements of a telescope, in the objective focus of which a convex lens for varying the focal distance of the objective is movably arranged; Fig. 2 represents the same optical elements illustrated in Fig. 1 in which, however, the lens for changing the magnification assumes another position with relation to the objective whereby the instrument is shortened; Fig. 3 illustrates the simultaneous insertion of a convex lens for changing the image magnification and of a system of reversing prisms for eliminating the change of the length of the instrument, the coupling between the lens and the reversing system being omitted, and the convex lens and the one prism of the reversing system being shown in two different positions; Fig. 4 is a perspective view of the optical instruments shown in Fig. 3. Fig. 5 is a longitudinal section of a telescope having an optical system, such as shown in Figs. 3 and 4.

The objective is designated by the reference numeral 1 throughout the drawing. 2 is the ocular, 3 designates the exit pupil, 4 designates an axially movable convex lens for changing the objective magnification, 5 and 6 designate the two rectangular triangle prisms of a Porro reversing system.

7 are the outlines of a diaphragm arranged in the image plane.

In the embodiment shown in Fig. 1 the convex lens 4 is located in the focus of the objective 1. In this position the lens 4 has only the effect that it causes the rays passing through the instrument to converge somewhat toward the ocular 2. If the lens 4 is moved toward the objective it effects, as Fig. 2 clearly shows, that the image plane is approached to the objective and that the magnification is reduced.

In the arrangement shown in Fig. 3 the Porro reversing system of prisms 5, 6 is still inserted between the objective and the image plane 7 into the path of the rays, which system permits by the relative displacement of its prisms that the change of the length of the path which is due to the displacement of the lens 4 is compensated so that the length of the instrument does not need to be changed. The prism 6 is supposed to be movable. The drawing shows the position of the parts for two different magnifications, the one position of the movable parts being shown in full lines and the other position thereof being shown in dotted lines.

In the instrument shown in Fig. 5 the optical elements are designated with the same numerals as the corresponding parts in Figs. 3 and 4. 8 is the casing of the instrument, having a screw threaded shaft 9 mounted therein, with an actuating knob 10. The shaft 9 has two separate screw threads 11 and 12, which are of different pitches. The screw thread 11 is engaged with a non-rotatable nut 13 having the prism 6 fixed to it; the screw thread 12 carries a nut 14 forming a non-rotatable mounting for the lens 4. On rotation of the knob 10 the nuts 13 and 14 are shifted lengthwise on the shaft 9, and carrying with them the prisms 6 and lens 4 respectively, the pitches of the screw threads 11 and 12 being so proportioned that the image plane of the instrument remains unchanged.

What I claim is:

1. In a telescope in combination with an objective and an ocular arranged at a substantially unvariable distance from each other, an axially adjustable lens system and an adjustable multiple reversing prism system, the elements of which being adapted to be displaced with relation to each other in such manner that the elements of the prism system, by the change of the length of the light path effected by their displacement, compensate the displacement of the image plane effected by the adjustment of the lens system.

2. In a telescope in combination with an objective and an ocular arranged at a substantially unvariable distance from each other, an axially adjustable lens system positioned within the path of rays between said objective and said ocular adapted to coöperate with said objective so as to form with it a compound system having an image plane positioned in dependence from the position of the objective with relation to that of the adjustable lens system and a Porro-prism system inserted within the path of rays between said objective and adjustable lens system, the distance of its elements adapted to be adjusted so as to compensate the displacement of the image plane of the objective on displacement of the adjustable lens system.

3. In a telescope in combination with an objective and an ocular arranged at a substantially unvariable distance from each other, an axially adjustable lens system positioned within the path of rays between said objective and said ocular adapted to coöperate with said objective so as to form with it a compound system having an image plane positioned in dependence from the position of the objective with relation to that of the adjustable lens system and a Porro-prism system inserted within the path of rays between said objective and adjustable lens system, one of its elements being fixed and the other movable in axial direction so as to compensate the displacement of the image plane of the objective on displacement of the adjustable lens system.

In testimony whereof I have signed this specification in the presence of two subscribing witnesses.

HEINRICH JACOB.

Witnesses:
HENRY HASPER.
WOLDEMAR HAUPT.